March 19, 1968          L. AFTON          3,373,863
COMBINED HOLDER AND UTENSIL FOR A FEVER THERMOMETER
Filed Aug. 8, 1966          2 Sheets-Sheet 1
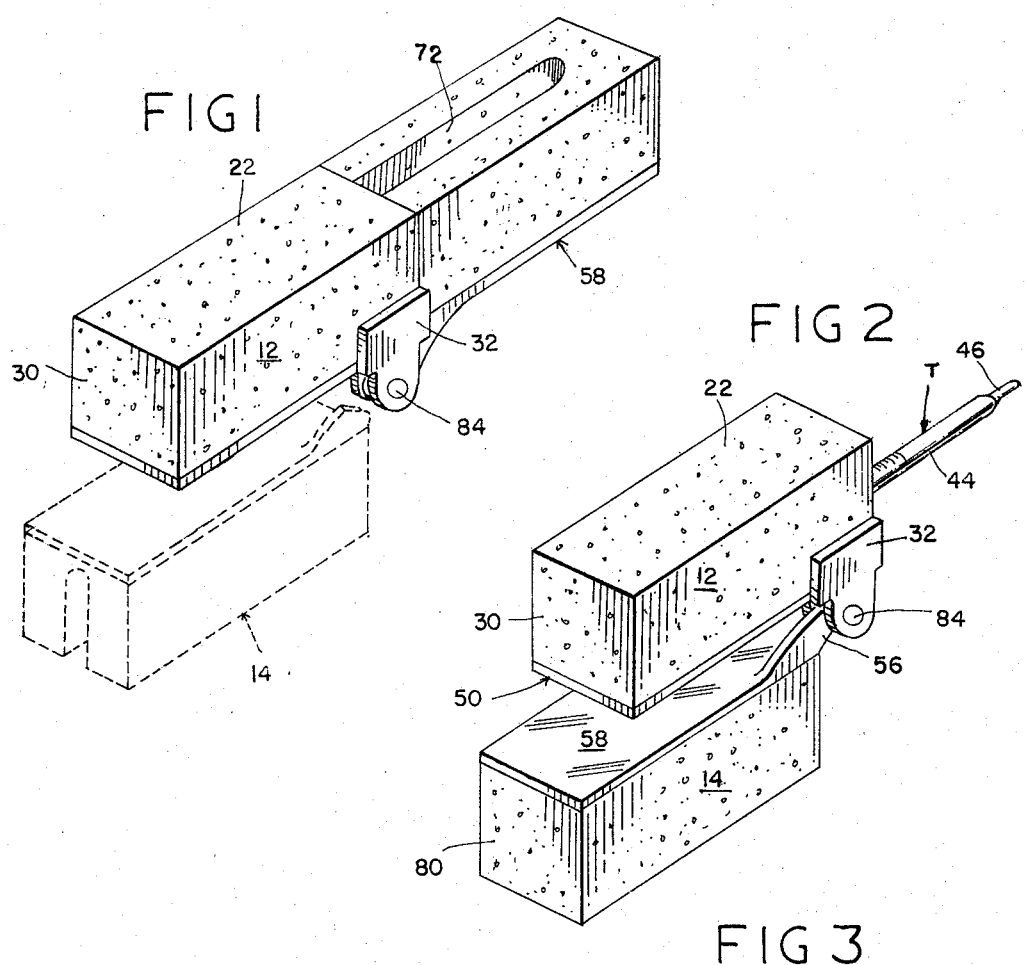
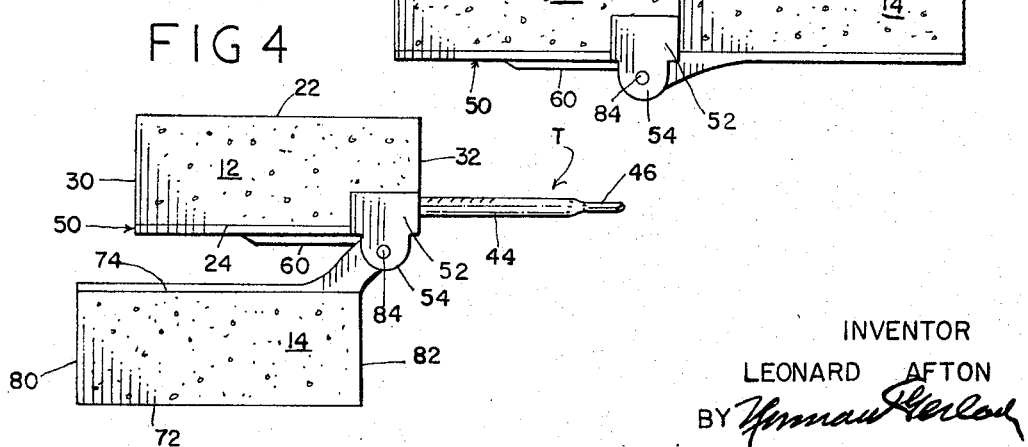
INVENTOR
LEONARD AFTON
BY
ATT'Y March 19, 1968     L. AFTON     3,373,863
COMBINED HOLDER AND UTENSIL FOR A FEVER THERMOMETER
Filed Aug. 8, 1966     2 Sheets-Sheet 2
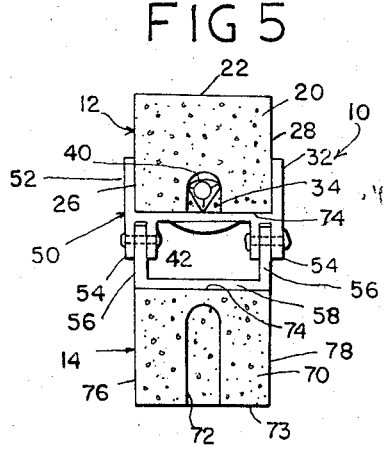
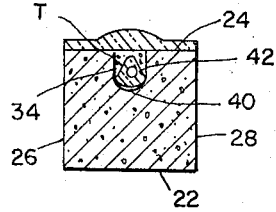
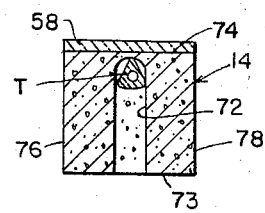
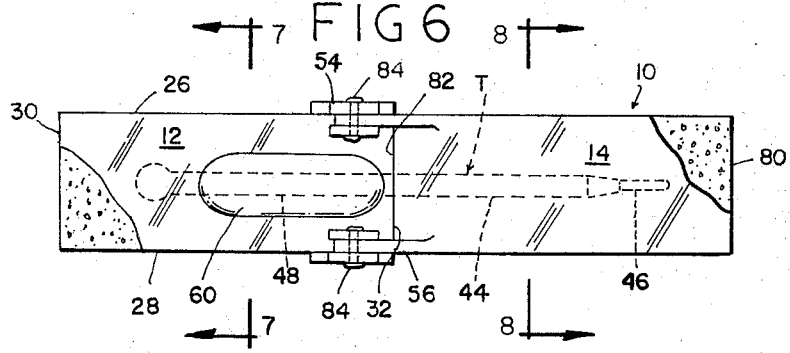
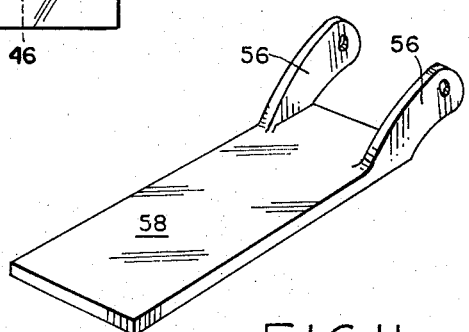
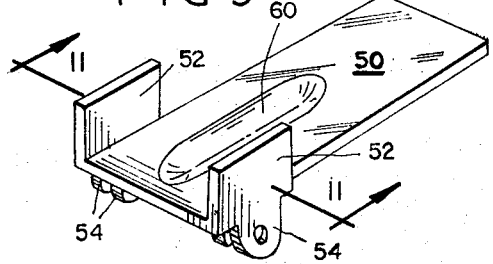
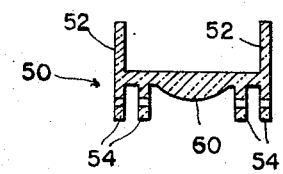
INVENTOR
LEONARD AFTON
BY
ATT'Y United States Patent Office 3,373,863
Patented Mar. 19, 1968

3,373,863
COMBINED HOLDER AND UTENSIL FOR
A FEVER THERMOMETER
Leonard Afton, 4880 N. Marine Drive,
Chicago, Ill. 60640
Filed Aug. 8, 1966, Ser. No. 571,113
6 Claims. (Cl. 206—16.5)

ABSTRACT OF THE DISCLOSURE

A holder for a fever thermometer which enables the thermometer to be introduced into the oral cavity without removing the thermometer from the holder. A hinged section of the holder swings to an out-of-the-way position to expose the bulb end of the thermometer for such oral introduction.

---

The present invention relates generally to a combined holder and utensil for a fever thermometer and has particular reference to a novel thermometer case which, when the thermometer is not in use, maintains the thermometer substantially encased throughout its entire length so that it is incapable of either side play or end play within the case, and which, when the thermometer is in use, continues to maintain a major portion of the thermometer encased and exposes only that portion of the thermometer which is actually applied to the body of the person whose temperature is being taken. The present combined holder and utensil further affords a convenient means for manipulating the thermometer either in applying the same to or withdrawing the same from the body of the user, or in applying centrifugal force to the same for "shake down" purposes. Finally, the present combined holder and utensil is in the form of an articulated thermometer case which, when in its open condition so as to expose a portion of the thermometer for application to a body cavity as previously indicated, presents a limit stop or gauging surface which will control the depth of penetration of the thermometer into the cavity and thus insure proper application of the thermometer to the body of the user, and which, when in its closed condition so as substantially completely to encase the thermometer as previously indicated, will present the readable scale portion of the thermometer to view for reading purposes, while at the same time offering a degree of magnification to the scale and also holding the thermometer with its readable side properly oriented for the most effective reading of said scale portion of the thermometer.

The provision of a combined holder and utensil for a fever thermometer such as has briefly been outlined above and possessing the stated advantages constitutes the principal object of the invention.

Other objects and advantages of the invention, not at this time enumerated, will readily suggest themselves from a consideration of the following detailed description or specification.

In the accompanying two sheets of drawings forming a part of this specification, one illustrative embodiment of the invention is shown.

In these drawings:

FIG. 1 is a perspective view of a thermometer case embodying the principles of the present invention, showing the case in its closed condition;

FIG. 2 is a perspective view similar to FIG. 1 but showing the case in its open condition of actual thermometer use;

FIG. 3 is a side elevational view of the structure shown in FIG. 1;

FIG. 4 is a side elevational view of the structure shown in FIG. 2;

FIG. 5 is an end elevational view of the structure shown in FIG. 4;

FIG. 6 is a bottom plan view of the improved thermometer case shown in FIG. 1;

FIG. 7 is a transverse sectional view taken on the line 7—7 of FIG. 6;

FIG. 8 is a transverse view taken on the line 8—8 of FIG. 6;

FIG. 9 is a perspective view of the combined magnification lens and hinge plate which is employed in connection with the invention;

FIG. 10 is a perspective view of the cooperating hinge plate; and

FIG. 11 is an end view of the hinge plate of FIG. 9.

Referring now to the drawings in detail and in particular to FIGS. 1, 2, 4 and 5, a combined holder and utensil for a fever thermometer embodying the principles of the present invention is designated in its entirety by the reference numeral 10 and it is in the form of an articulated two-piece thermometer case including a base holder section 12 and a protective section 14. Each section includes a block-like body of expanded polystyrene foam or other similar material containing minute occluded air cells, and a hinge section which is adhesively secured thereto. The two sections are hingedly connected together for swinging movement of the section 14 about the section 12 in a manner and for a purpose that will be made clear presently.

The holder section 12 includes an elongated block-like body 20 which is of rectangular configuration and has a top face 22, a bottom face 24, side faces 26 and 28, an outer end face 30 and an inner end face 32, the terms "inner" and "outer" having reference to the overall thermometer case considered as a whole. The bottom face 24 has formed therein a longitudinally extending, centrally located trough 34 (see FIGS. 3, 5 and 7) which is of a depth slightly greater than one-half the vertical thickness of the body 20 and communicates with or opens at its inner end onto the end face 32. The length of the trough 34 is not critical and in the illustrated form of the invention, it is shown as being approximately four-fifths of the over-all length of the body 20. In any event, it is essential that the length of the trough 34 be at least as long as the scale portion of a standard or conventional fever thermometer such as is designated in the drawings by the reference letter T. The width of the trough 34 is fairly critical and it is slightly of less width than the base width of the thermometer as subsequently defined herein.

Fever thermometers are usually of triangular configuration in cross section so that the thermometer has a base side which presents a visible contrast plate which is usually white in color for contrast with the mercury or other fluid column in the thermometer. Thus, the thermometer T has a base side 40 and converging sides 42. One of the sides 42 has a scale (not shown) thereon while the other side has indicia markings which relate to the scale as is conventional. The base width of the thermometer T is the transverse dimension of the base side 40 and the width of the trough 34, as hereinbefore stated, is slightly less than such transverse dimension. The thermometer T, when in place in the case, may roughly be divided into two reference portions, namely, an outer or proximate end portion 44 (see FIG. 4) which includes the usual "bulb" or reservoir 46 for the thermally expansive fluid, and an inner or distal end portion 48 which encompasses at least a portion of the readable thermometer scale. The proximate end section is designed for reception in the body cavity of the user, whether the same be an oral or a rectal cavity, and the scale portion of the thermometer is largely disposed in the distal end portion 48 and usually extends partially into the proximate end portion 44.

The trough 34 is adapted to receive therein the distal end portion 48 of the thermometer T with the base side 40 thereof opposing the bottom wall of the trough, this distal end portion lying deep within the trough and being substantially coextensive therewith. Since the width of the trough 34 is slightly less than the width of the base side 40 of the thermometer T, the latter is frictionally secured within the trough. Insertion of the thermometer into the trough is accomplished by forcing the thermometer endwise along the trough so that the base edges of the thermometer ream their own way into the material of the body 20 and thus hold the thermometer properly oriented within the trough for proper viewing of the fluid column through the open side of the trough.

The holder section 12 of the case further includes a hinge plate 50 (see FIG. 9) which preferably is formed of a transparent plastic material such as "Lucite." The hinge plate 50 is of flat rectangular construction and has longitudinal and transverse dimensions commensurate with the longitudinal and transverse dimensions of the bottom face 24 of the body 20. The plate 50 fits flush against the bottom face 24 and has two spaced apart upstanding reinforcing ears 52 which straddle the body 20 and fit flatly against the side faces 26 and 28 as best seen in FIG. 5. Bifurcated ears 54 project downwardly from the plate (see FIG. 11) and constitute fixed hinge supports which are designed for cooperation with hinge arms 56 on a hinge plate 58 which is associated with the protective section 14 of the case as will be described presently. A medial region of the transparent hinge plate 50 is thickened on a rounded bias to provide an elongated integral lens rib 60 (see FIGS. 3 to 7, inclusive) which underlies the trough 34 and through which the scale portion 46 of the thermometer is visible at such time as the case is in its closed condition as shown in FIGS. 1 and 6.

It is to be noted at this point that since the trough 34 receives only the distal or scale portion 48 of the thermometer T, the proximate portion 44 of the thermometer is disposed wholly exteriorly of the holder section 12 as best seen in FIGS. 2 and 4.

The movable protective section 14 of the case is similar in its construction to the section 12 and it, likewise, is comprised of a block-like body 70 of expanded polystyrene material and the previously mentioned hinge plate 58. The body 70 is substantially identical to the body 20 but when the two case sections are assembled in their hinged relationship and the sections are in the closed condition of the case, the trough 72 which is provided in the body 70 faces upwardly and the bottom regions of the two troughs 34 and 72 register in end-to-end fashion with each other.

The block-like body 70 of the protective case section 12 is provided with top and bottom faces 73 and 74, side faces 76 and 78, an outer end face 80, and an inner end face 82. The trough 72 is designed for reception therein of the proximate end portion 44 of the thermometer T when the thermometer case is in its closed condition as shown in FIG. 1.

The hinge plate 58 may be formed of the same material as that of the hinge plate 50 and is adhesively secured in face-to-face relationship to the bottom face 74 of the body 70. The hinge arms 56 have their distal ends hingedly secured to the hinge ears 54 by pivot pins 84 and thus, the movable protective section 14 of the thermometer case is capable of swinging movement between the closed condition of the case wherein it is shown in FIGS. 1 and 3, and the open condition wherein it is shown in FIGS. 2 and 5. In the closed condition of the case, the two inner faces 32 and 82 of the case section 20 and 70 are disposed in coextensive face-to-face contact while the bottom regions of the two troughs 34 and 72 are in end-to-end register to the end that the thermometer T is coextensive with the two troughs and has its proximate end portion 44 nested within the trough 72 and its distal end portion 46 nested within the trough 34. The width of the trough 72 is slightly greater than the width of the trough 34 so that the proximate thermometer portion 44 will not bind in said trough as the case section 14 is swung toward and away from the proximate end portion 44 of the thermometer T. In the open condition of the thermometer case, the section 14 underlies the section 12 as shown in FIGS. 2 and 5 and the proximate end portion 44 of the thermometer is completely exposed so that it is available for insertion into the body cavity of the user in the usual manner of insertion.

Since the two case sections 12 and 14 are of lightweight construction, their combined mass or weight presents no discomfort to the user of the thermometer T when the proximate end portion 44 is inserted into the body cavity. The inner end face 32 of the section 12 serves as a limit stop to prevent over-insertion of the thermometer into the body cavity. In use, after the thermometer has remained within the body cavity for the required period of time, the thermometer may be withdrawn by the simple expedient of grasping the open case and pulling the same bodily away from the cavity, thus exposing the proximate end portion of the thermometer. Thereafter, the movable protective section 14 of the case may be swung throughout an angle of approximately 180° to bring the two sections into their end-to-end relationship and position of contiguity, at which time the scale portion of the thermometer will be plainly visible through the lens rib 60 of the combined hinge and lens plate 50 as clearly shown in FIG. 6. At this time, the proximate end portion 44 of the thermometer will have been restored to its nested position within the trough 72 of the case section 14 and substantially the entire length of the thermometer will be encased by the expanded polystyrene material of the case sections 12 and 14. The rigidity of the hinge structure 54, 56, 84, coupled with the fact that the two case sections 12 and 14 are disclosed in end-to-end relationship, establishes a rigid encasement for the thermometer that resists bending in any direction and also holds the thermometer against end or side play within the case. It has been found that even the act of dropping the encased thermometer from an appreciable height will not result in fracture or other damage to the thermometer, nor damage to the case itself.

Not only does the present thermometer case afford convenient manipulation of the thermometer in the doctor's or nurse's hands for purposes of thermometer application to and removal from the body cavity, but also the case lends itself to manipulation of the thermometer during centrifugal shake-down operations. The operator is not obliged to directly grasp the thermometer itself since the entire case, in its closed condition, may be swung through the necessary gyrations to impart a centrifugal shake-down to the instrument. This results in a safer procedure since there is less danger of the case slipping from theh and of the user than there is of the relatively small thermometer slipping from the fingers of the user. A more positive grip may be obtained on the case than on the thermometer itself.

The invention is not to be limited to the exact arrangement of parts shown in the accompanying drawings or described in this specification as various changes in the details of construction may be resorted to within departing from the spirit or scope of the invention. Therefore, only insofar as the invention is particularly pointed out in the accompanying claims is the same to be limited.

Having thus described the invention what I claim as new and desire to secure by Letters Patent is:

1. A two-part articulated combined holder and utensil for a fever thermometer comprising, in combination, a fixed base holder section and a protective section, each section inculding an elongated block-like body of generally rectangular configuration and having a top face, a bottom face, side faces, and inner and outer end faces, said inner end faces being planar, means hingedly connecting the protective section to the base holder section for swinging movement between a first closed thermometer-encompassing position wherein the protective section is in end-to-end alignment and contiguity with the holder section so that the inner end faces of the sections abut each other in face-to-face relationship, and a second open out-of-the-way position wherein the protective section underlies the holder section with its bottom face facing upwardly and directly opposing the bottom face of the holder section and with the two sections extending in parallelism, the top face of the protective section being formed with a longitudinally extending trough which opens into the inner end face of such section and the bottom face of the protective section being formed with a similar longitudinally extending trough which opens into the inner end face of said latter section, said troughs being disposed with their bottom regions in end-to-end alignment and register with each trough being inverted with respect to the other trough when the protective section is in its first position, the combined length of said troughs being at least equal to the over-all length of a fever thermometer, said trough in the holder section being adapted fixedly to receive therein the distal scale portion of the thermometer with the proximate bulb section thereof projecting endwise from said latter trough for exposure and oral reception thereof when the protective section is in its second out-of-the-way position, said trough in the protective section being adapted to receive therein and encompass the proximate bulb portion of the thermometer when the protective section is in its first position.

2. A two-part articulated combined holder and utensil as set forth in claim 1 and wherein said hinge means comprises a flat hinge plate secured to and coextensive with the bottom face of each of said block-like bodies, a pair of hinge ears on one of said plates adjacent to and spaced inwardly from the plane of the inner end face of the associated body, cooperating hinge arms on the other plate adjacent to the inner face of its associated body, and hinge pins connecting the hinge ears and hinge arms, the inward spacing of said hinge ears and the length of said hinge arms being such that when the protective section is in its open out-of-the-way position its inner end face is displaced in a longitudinal section from the inner end face of the holder section.

3. A two-part articulated combined holder and utensil as set forth in claim 2 and wherein the hinge plate on the bottom face of the block-like body of the holder section is transparent for thermometer scale viewing purposes.

4. A two-part articulated combined holder and utensil as set forth in claim 3 and wherein the hinge plate on the bottom face of the block-like body of the holder section is formed with a magnifying lens section which underlies the associated trough for scale magnification purposes.

5. A two-part articulated combined holder and utensil as set forth in claim 1, wherein said sections are formed of a material having the physical characteristics of expanded polystyrene foam, and wherein the width of the trough in the body of the holder section is slightly less than the over-all width of the thermometer so that the scale portion of the latter is frictionally received in the trough.

6. A two-part articulated combined holder and utensil as set forth in claim 5 and wherein the width of the trough in the body of the protective section is slightly wider than the over-all width of the thermometer so that the bulb portion of the latter is capable of free entry into and withdrawal from said latter trough in a generally sidewise direction.

References Cited

UNITED STATES PATENTS

| | | | |
|---|---|---|---|
| 498,455 | 5/1893 | Bartlett | 206—17 |
| 3,052,158 | 9/1962 | Sonni | 206—16.5 |

WILLIAM T. DIXSON, Jr., *Primary Examiner.*